(12) United States Patent
P A et al.

(10) Patent No.: US 12,737,821 B2
(45) Date of Patent: Sep. 15, 2026

(54) PROVIDER ACTIVITY ANOMALY DETECTION

(71) Applicant: OPTUM, INC., Minnetonka, MN (US)

(72) Inventors: Rakesh P A, Karnataka (IN); Vijaychandar Natesan, Karnataka (IN); Kevin Obrien, Stanton Island, NY (US); Scott R. Vandeleest, Green Bay, WI (US); Pawan Kumar Pandey, Karnataka (IN); Ramesh Rangasamy Ganesan, Karnataka (IN); Arun Kumar Kumar, Carmel, IN (US); Guntupalli Sumanth Naga Deepak, Andhra Pradesh (IN); Aman Kharb, Haryana (IN); Diane T. Smith, Durham, ME (US); Rahimunnisa Pathan, Karnataka (IN)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/971,854

(22) Filed: Dec. 6, 2024

(65) Prior Publication Data

US 2026/0057453 A1 Feb. 26, 2026

Related U.S. Application Data

(60) Provisional application No. 63/685,503, filed on Aug. 21, 2024.

(51) Int. Cl.
*G06Q 40/08* (2012.01)
*G06N 3/088* (2023.01)

(52) U.S. Cl.
CPC ........... *G06Q 40/084* (2025.08); *G06N 3/088* (2013.01); *G06Q 40/08* (2013.01); *G06Q 40/083* (2025.08)

(58) Field of Classification Search
CPC .... G06Q 40/08; G06Q 40/083; G06Q 40/084; G06N 3/088
See application file for complete search history.

(56) References Cited

U.S. PATENT DOCUMENTS

| | | | | |
|---|---|---|---|---|
| 11,368,422 | B1 * | 6/2022 | Sohn | H04L 51/212 |
| 11,386,999 | B2 | 7/2022 | Basu | |

(Continued)

OTHER PUBLICATIONS

Naidoo et al., “Unsupervised Anomaly Detection of Healthcare Providers Using Generative Adversarial Networks”, I3E 2020, LNCS 12066, pp. 419-430.

*Primary Examiner* — Scott C Anderson
(74) *Attorney, Agent, or Firm* — MARSHALL, GERSTEIN & BORUN LLP

(57) ABSTRACT

Techniques for automatically detecting inactive addresses of providers using unsupervised learning approaches are provided. The techniques include determining an activity trend of an address. Responsive to determining that the address is associated with increasing activity, determining an active metric of the address, which indicates a likelihood of the address being active. Responsive to determining that the address is associated with decreasing activity, determining an inactive metric of the address, which indicates a likelihood of the address being inactive. The techniques further include determining whether the address is active or inactive based on the active metric and/or inactive metric. In some embodiments, the active metric or inactive metric is a weighted sum of z scores determined based on Gaussian distributions generated with respect to various benchmarks or provider features. In some embodiments, the weights used to determine the active metric or inactive metric are determined using RLHF techniques.

20 Claims, 6 Drawing Sheets

(56) References Cited

U.S. PATENT DOCUMENTS

| | | | | |
|---|---|---|---|---|
| 11,651,237 | B2 | 5/2023 | Rickard, Jr. et al. | |
| 2014/0081652 | A1 | 3/2014 | Klindworth | |
| 2019/0073594 | A1* | 3/2019 | Eriksson | G06N 3/0464 |
| 2021/0103991 | A1 | 4/2021 | Kern et al. | |
| 2023/0409979 | A1* | 12/2023 | Thompson | G06Q 40/06 |
| 2024/0267435 | A1* | 8/2024 | Wulf | G06N 5/04 |

* cited by examiner

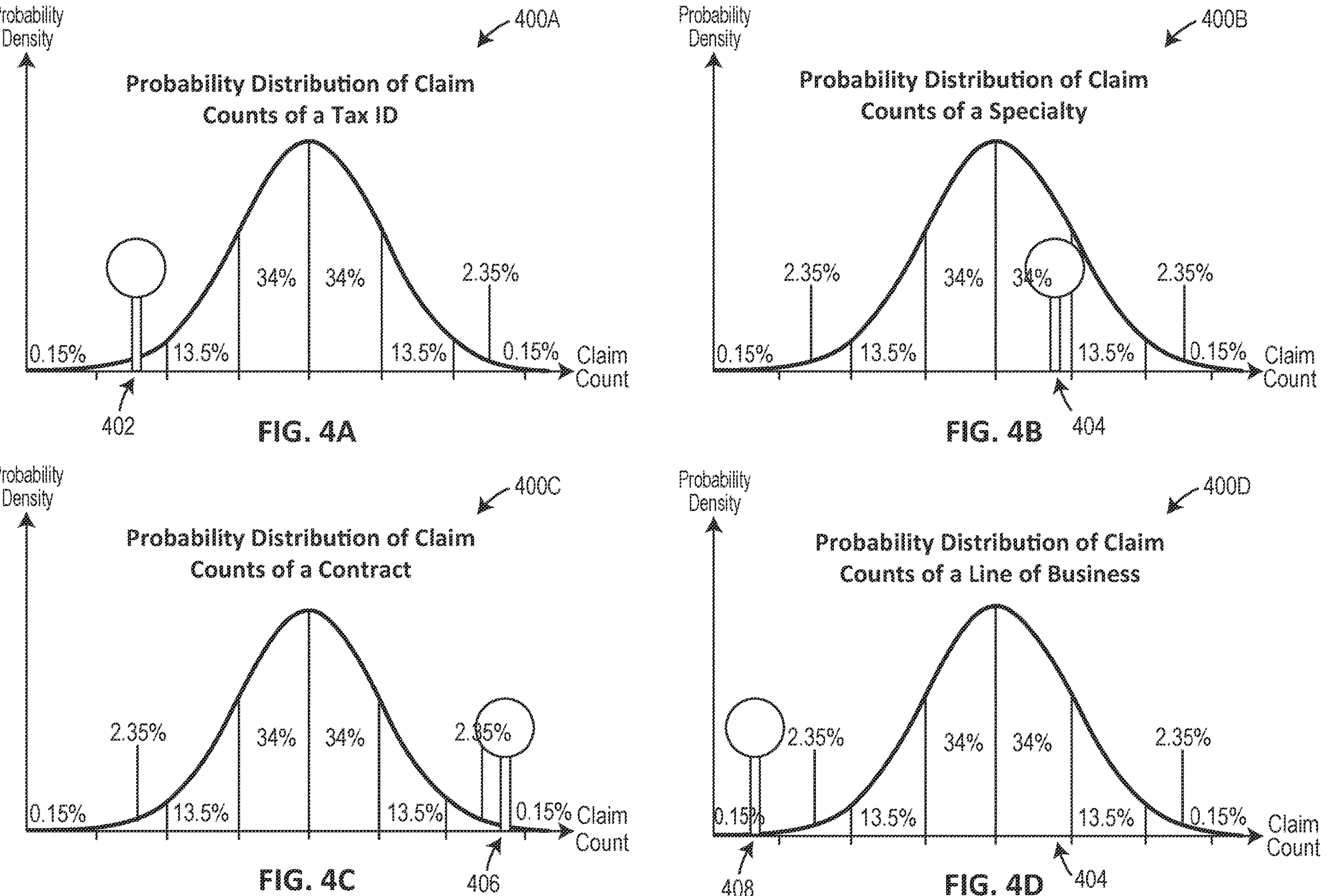
400A
Probability Density
Probability Distribution of Claim Counts of a Tax ID
0.15%
13.5%
34%
34%
13.5%
2.35%
0.15%
Claim Count
402
FIG. 4A
400B
Probability Density
Probability Distribution of Claim Counts of a Specialty
2.35%
0.15%
13.5%
34%
34%
13.5%
2.35%
0.15%
Claim Count
FIG. 4B
404
400C
Probability Density
Probability Distribution of Claim Counts of a Contract
2.35%
0.15%
13.5%
34%
34%
13.5%
2.35%
0.15%
Claim Count
FIG. 4C
406
400D
Probability Density
Probability Distribution of Claim Counts of a Line of Business
2.35%
0.15%
13.5%
34%
34%
13.5%
2.35%
0.15%
Claim Count
408
FIG. 4D
404

PROVIDER ACTIVITY ANOMALY DETECTION

CROSS-REFERENCE TO RELATED APPLICATIONS

This application claims the benefit of U.S. Provisional Patent Application No. 63/685,503, filed on Aug. 21, 2024, the entire disclosure of which is hereby incorporated herein by reference.

TECHNICAL FIELD

The present disclosure generally relates to data anomaly detection techniques, and more particularly, to detecting inactive addresses of providers using unsupervised learning techniques.

BACKGROUND

In the health insurance industry, it is important to detect inactive addresses of providers (e.g., healthcare providers). Undetected inactive addresses may lead to ineffective appointments with providers and/or unidentified insurance fraud. Although providers are usually required to update their addresses when they move to a different location, they often fail to do so in a timely manner. Due to the large volume of providers (e.g., millions) enrolled in a medical insurance system, however, it may be cumbersome or even impractical to manually check in with every enrolled provider to keep their addresses updated. Moreover, automated techniques can be both inaccurate and inefficient.

BRIEF DESCRIPTION OF THE DRAWINGS

The Figures described below depict preferred embodiments for purposes of illustration only. One skilled in the art will readily recognize from the following discussion that alternative embodiments of the systems and methods illustrated herein may be employed without departing from the principles of the disclosure described herein.

FIG. 4A depicts an example graph of probability distribution of claim counts associated with a particular tax identifier.

FIG. 4B depicts an example graph of probability distribution of claim counts associated with a particular specialty.

FIG. 4C depicts an example graph of probability distribution of claim counts associated with a particular contract.

FIG. 4D depicts an example graph of probability distribution of claim counts associated with a particular line of business.

DETAILED DESCRIPTION

Figure 1:
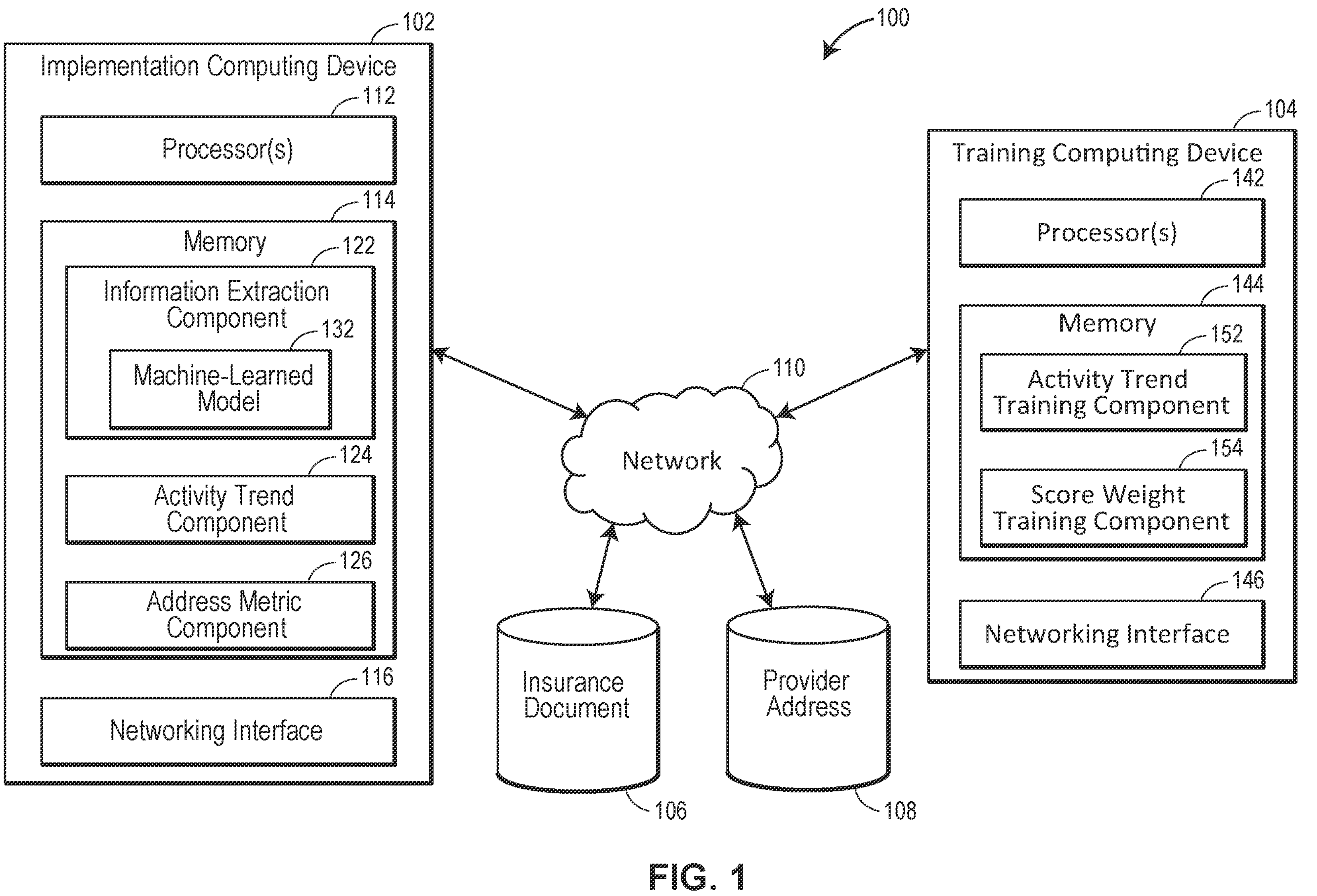
FIG. 1 depicts an example computing system in which techniques of the present disclosure may be implemented.

Conventional approaches to determining whether addresses are active include manually determining whether an address is inactive. For example, human representatives may reach out to every provider to determine whether their addresses on file in the insurance system are still valid addresses. However, the number of addresses in an insurance system may be in the millions. Manually checking in with providers to verify the activity of their addresses may involve intensive human labor or even be impractical. Thus, there is a need for computing techniques that automate the process.

One such approach would be to use supervised learning techniques to detect inactive addresses. Supervised learning techniques use data labeled with expected output for a given training sample/input. Consequently, supervised learning techniques rely on the quantity of labeled data and the quality of the labels. However, the quantity of labeled data associated with provider addresses may be insufficient, the quality of data labels may be poor, and/or the data may be highly unbalanced, with each of these characteristics leading to deficiencies in the trained model. In particular, an insufficient quantity of labeled data can cause the trained model to suffer from overfitting, both insufficient quantity and poor data label quality can cause the trained model to provide inaccurate results, and imbalance of the data set can cause the model to produce skewed output. With respect to the latter problem, for example, the model may suffer from poor precision and recall, and/or produce more false positives than false negatives, irrespective of the quantity of training data. Thus, there is more specifically a need for automated techniques that provide accurate results in an efficient manner.

Advantageously, the techniques of this disclosure can detect inactive addresses in an accurate and efficient manner, e.g., with a reduced number of false positives and without necessarily having to employ onerous training procedures (e.g., collecting and labeling huge amounts of training data).

The disclosed techniques include determining whether addresses of providers are active by determining/calculating, in at least some scenarios, both active metrics and inactive metrics for those addresses. The techniques use unsupervised learning approaches to determine these metrics, thereby overcoming the above-noted technical drawbacks of supervised learning techniques and supervised learning models. More particularly, in some embodiments, the active metric or inactive metric is a weighted sum of one or more component metrics with respect to one or more features of the provider, respectively. A given component metric may indicate how much the claim count of the address deviates from a mean claim count with respect to the respective feature, for example. In some embodiments, the disclosed techniques determine the weights of the component metrics using reinforcement learning from human feedback (RLHF) techniques.

The techniques of this disclosure further include determining an activity trend (e.g., increasing activity or decreasing activity) of an address of a provider, and determining an active metric or an inactive metric based on that activity trend. For example, the disclosed techniques may determine an active metric for the address responsive to determining that the address is associated with increasing activity, or instead determine an inactive metric for the address responsive to determining that the address is associated with decreasing activity. Furthermore, when the address is associated with decreasing activity, the disclosed techniques can determine whether the inactive metric satisfies a particular condition (e.g., whether the inactive metric is greater than an inactive metric threshold). If that condition is not satisfied, the disclosed techniques additionally determine an active metric, and determine whether the active metric satisfies another condition (e.g., whether the active metric is greater than an active metric threshold). If the active metric satisfies that condition, the disclosed techniques determine the address to be active. Advantageously, this process of (in some scenarios) calculating both inactive and active metrics can reduce the likelihood of false positives for inactive addresses, as compared to only using an inactive metric.

Further, as indicated above, the techniques in some embodiments include training the weights for determining the active/inactive metrics using RLHF techniques. Advantageously, this causes the weights for determining the active/inactive metrics to evolve, over time, in a manner that further improves accuracy, precision, and/or recall. Moreover, the combination of determining an activity trend, using component metrics to determine active or inactive metrics, and refining the weights using RLHF techniques can further help overcome the problems caused by imbalanced data and/or poorly labeled datasets.

Thus, the techniques of this disclosure provide technical solutions to technical problems, and improve computer functionality, by automating the detection of inactive provider addresses in a particular way that is both more accurate and more efficient than alternative techniques.

Example Computing System

FIG. 1 depicts an example computing system 100 in which various embodiments of the present disclosure may be implemented. It should be appreciated that, while the various components of the example computing system 100 (e.g., an implementation computing device 102, a training computing device 104, etc.) are illustrated in FIG. 1 as single components, the example computing system 100 may include multiple (e.g., dozens, hundreds, thousands) of implementation computing devices 102, training computing devices 104 that are simultaneously connected to the network 110 at any given time.

The example computing system 100 includes an implementation computing device 102, a training computing device 104, an insurance document database 106, a provider address database 108, and a network 110. The implementation computing device 102 is generally configured to determine whether an address of a provider is active. The training computing device 104 is generally configured to train parameters used by the implementation computing device 102, such as weights and/or other parameters used by the activity trend component 124 and/or the address metric component 126. The insurance document database 106 contains/stores insurance claim documents. An insurance document may include, for example, an address of a provider, a zip code of the provider, a tax identifier of a medical organization associated with the provider, a specialty of the provider, an insurance contract of the provider, a line of business associated with a provider, and so on. As used herein, a "line of business" may refer to a specific category or type of insurance coverage. The provider address database 108 has stored thereon addresses of providers.

The implementation computing device 102 includes one or more processors 112, memory 114, and a networking interface 116. The memory 114 stores an information extraction component 122, an activity trend component 124, and an address metric component 126.

The information extraction component 122 includes executable instructions for extracting addresses of providers.

In some embodiments, the information extraction component 122 includes a machine-learned model 132 configured to process natural language, such as a large language model (LLM). To obtain an address of a provider, the implementation computing device 102 may retrieve an insurance claim document from the insurance document database 106, and extracts the address of the provider from the insurance claim document. The implementation computing device 102 may further retrieve an address associated with the provider from the provider address database 108. The implementation computing device 102 then determines, by using the machine-learned model 132, whether the extracted address matches the retrieved address. If the addresses match, the implementation computing device 102 determines that address to be the address of the provider. If the addresses do not match, the implementation computing device 102 may flag the addresses for further (e.g., manual) review.

The activity trend component 124 includes executable instructions for determining whether an address of a provider is associated with increasing activity or decreasing activity. In some embodiments, the implementation computing device 102 determines the activity trend using long short-term memory (LSTM) techniques, as will be discussed in more detail in connection with FIG. 2.

The address metric component 126 includes executable instructions for determining an active metric or inactive metric of an address of a provider. In some embodiments, the implementation computing device 102 determines an active metric of an address responsive to determining that the address is associated with increasing activity, and conversely determines an inactive metric of an address responsive to determining the address is associated with decreasing activity. In some embodiments, the active or inactive metric is a weighted sum of z scores determined based on one or more probability distributions with respect to one or more features of the provider, as will be discussed in more detail in connection with FIGS. 3A-4D.

The networking interface 116 is generally configured to enable the implementation computing device 102 to communicate with the training computing device 104, insurance document database 106, provider address database 108, and/or any other suitable devices or combinations thereof. More specifically, the networking interface 116 enables the implementation computing device 102 to communicate with each component of the example computing system 100 across the network 110 through their respective networking interfaces. The networking interface 116 is configured to support at least one communication protocol of the network 110.

The training computing device 104 includes one or more processors 142, memory 144, and a networking interface 146. The one or more processors 142 may be configured in a similar manner as one or more processors 112. The networking interface 146 may be configured in a similar manner as networking interface 116.

The memory 144 has stored thereon an activity trend training component 152 and a score weight training component 154. The activity trend training component 152 includes executable instructions for training/setting parameters to be used by the activity trend component 124. The score weight training component 154 includes executable instructions for training/setting parameters to be used by the address metric component 126. The training processes will be described in detail in connection with FIGS. 2-5.

The network 110 may be a single communication network, or may include multiple communication networks of one or more types. In some embodiments, the network 110 includes multiple, entirely distinct networks (e.g., one or more networks for communications between implementation computing device 102 and training computing device 104, and a separate network for communications between the implementation computing device 102 and the training computing device 104, and so on). Example communication protocols of the network 110 include a fifth-, fourth-, or third-generation cellular network (5G®, 4G®, or 3G®, respectively), a Wi-Fi® network (802.11 standards), a WiMAX® network, or any other suitable wide area network (WAN), local area network (LAN), or personal area network (PAN), etc.

It will be understood that the above disclosure is one example and does not necessarily describe every possible embodiment. As such, it will be further understood that alternate embodiments may include fewer, alternate, and/or additional steps, components, and/or other elements, and/or be arranged in a different manner.

Example Process of Determining Activity Trend

As described above, upon obtaining an address of a provider, the implementation computing device 102 may determine an activity trend of the address of the provider. In some embodiments, the implementation computing device 102 may determine the activity trend using LSTM techniques.

Figure 2:
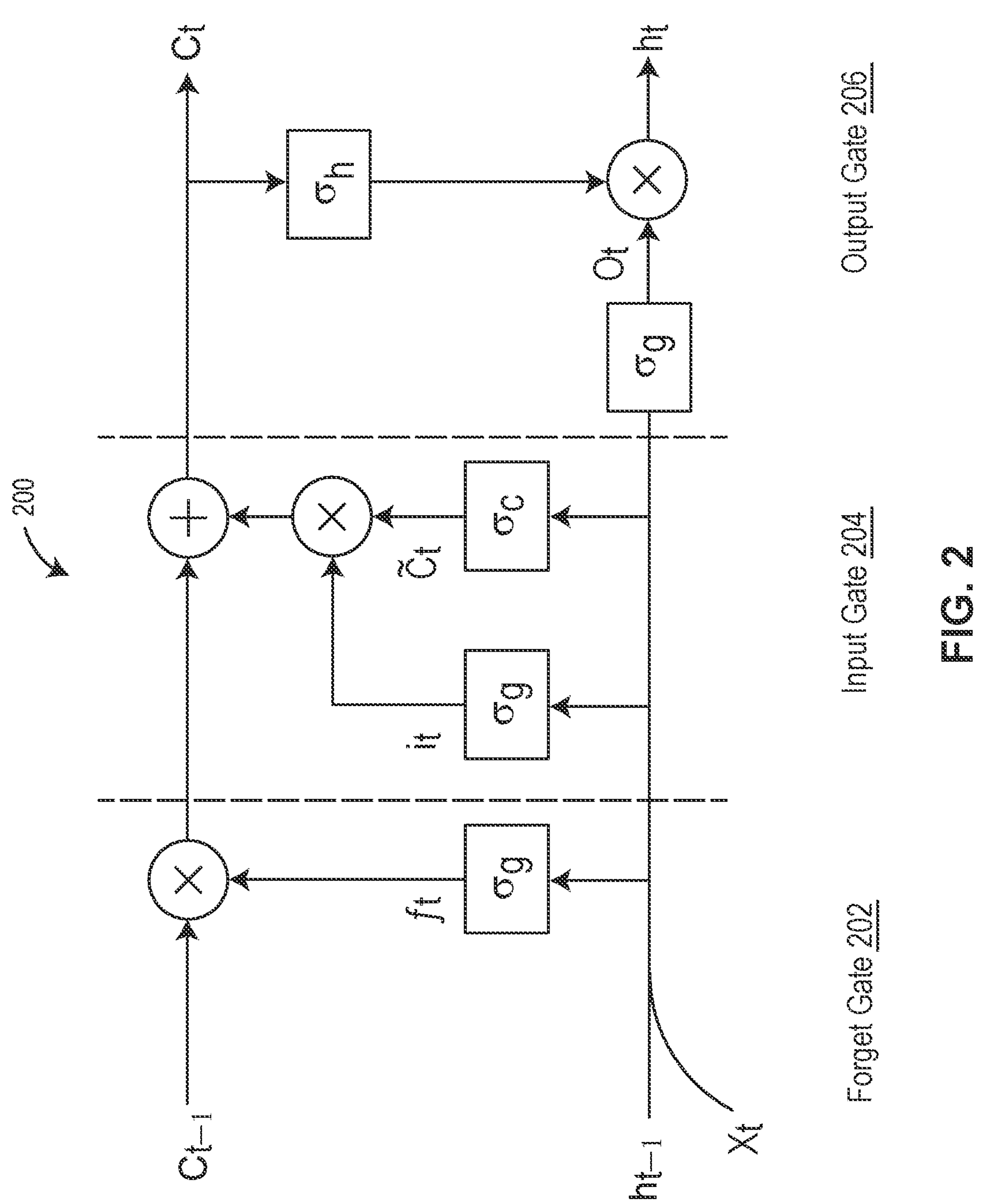
FIG. 2 depicts an example model for determining activity trends using long short-term memory (LSTM) techniques.

FIG. 2 depicts an example LSTM-based machine-learned (ML) model 200 for determining activity trends. The example ML model 200 includes a forget gate 202, an input gate 204, and an output gate 206.

The forget gate 202 is configured to determine how much information of a previous state needs to be preserved. At the forget gate 202, the input is combined with the previous output to generate a fraction between 0 and 1, wherein 1 means "remember everything" and 0 means "forget everything." The fraction is generated by a sigmoid function. More particularly, the forget gate 202 may function according to the following equation:

$$f_t = \sigma_g(W_f x_t + U_f h_{t-1} + b_f) \tag{1}$$

wherein $x_t$ is an input vector, $h_{t-1}$ is a vector representing a hidden state, $b_f$ is a bias vector, $W_f$ and $U_f$ are parameter matrices, $\sigma_g$ represents a sigmoid function, $f_t$ is an activation vector of the forget gate 202, the subscript t indexes a time step, and the initial value $h_0=0$.

The input gate 204 is configured to decide which new information is going to enter the state of LSTM. The input gate 204 may function according to the following equations:

$$i_t = \sigma_g(W_i x_t + U_i h_{t-1} + b_i) \tag{2}$$

$$\tilde{c}_t = \sigma_c(W_c x_t + U_c h_{t-1} + b_c) \tag{3}$$

wherein $i_t$ is an activation vector of the input gate 204, $W_i$, $U_i$, $W_c$, and $U_c$ are parameter matrices, $b_i$ and $b_c$ are bias vectors, and $\sigma_c$ represents a hyperbolic tangent function.

The output gate 206 is configured to generate an output (i.e., a new memory cell) and a new hidden state for further processing. The output gate 206 may function according to the following equations:

$$c_t = f_t \odot c_{t-1} + i_t \odot \tilde{c}_t \tag{4}$$

$$o_t = \sigma_g(W_o x_t + U_o h_{t-1} + b_o) \tag{5}$$

$$h_t = o_t \odot \sigma_h(c_t) \tag{6}$$

wherein $c_{t-1}$ and $c_t$ are cell state vectors, $\tilde{c}_t$ is a cell input activation vector, $o_f$ is an activation vector of the output gate 206, $W_o$ and $U_o$ are parameter matrices, $b_o$ is a bias vector, $\sigma_h$ represents a hyperbolic tangent function or $\sigma_h(x)=x$, the operator $\odot$ denotes the Hadamard product (element-wise product), and the initial value $c_0=0$.

To determine an activity trend of an address of a provider, the ML model 200 may use a plurality of claim counts associated with a particular time period as input. For example, the particular time period may be t months. The input $x_1$ to $x_t$ may be a claim count of each week from the first week to the $i^{th}$ week of the particular time period, respectively. The output $c_t$ may indicate the claim count of the $(t+1)^{th}$ week. Based on the output $c_t$, the implementation computing device 102 may determine whether that the address is associated with increasing activity or decreasing activity. As an example, if $c_t$ equals to or is greater than $x_t$, the implementation computing device 102 may determine that the address is associated with increasing activity. Conversely, if $c_t$ is less than $x_t$, the implementation computing device 102 may determine that the address is associated with decreasing activity. As another example, if $c_t$ equals to or is greater than an average of $x_1$ to $x_t$, the implementation computing device 102 may determine that the address is associated with increasing activity. Conversely, if $c_t$ is less than an average of $x_1$ to $x_t$, the implementation computing device 102 may determine that the address is associated with decreasing activity. As yet another example, the model may determine a plurality of output $c_t$ to $c_{t+n}$. If $c_t$ to $c_{t+n}$ show an increasing trend or a stable trend, the implementation computing device 102 may determine that the address is associated with increasing activity. Conversely, if $c_t$ to $c_{t+n}$ show a decreasing trend, the implementation computing device 102 may determine that the address is associated with decreasing activity.

The training computing device 104 may train an LSTM-based ML model with unsupervised learning techniques. For example, the training computing device 104 may initialize the parameter matrices W and U, and the parameter vectors b to be random matrices and random vectors, respectively. The training data may include claim counts $x_1$ to $x_t$ of providers of a particular time. In a training process, the training computing device 104 may, by executing the instructions of the activity trend training component 152, input $x_1$ into the ML model with initialized parameters. The ML model 200 may output $c_1$. The training computing device 104 may compute a difference between $c_i$ and $x_2$ and update the parameters such that the difference would be reduced if re-computed using the updated parameters. The training computing device 104 may then input $x_2$ into the ML model 200 with updated parameters to obtain $c_2$. The training computing device 104 may then update the parameters based on the difference between $c_2$ and $x_3$. After multiple iterations, the output $c_i$ will gradually converge to $x_{i+1}$. When the difference is less than a predetermined threshold, or the difference is converges to a certain value, the ML model 200 may be considered sufficiently trained. The implementation computing device 102, when needed, may retrieve the trained ML model 200 from the training computing device 104 or another source, or remotely access the ML model 200 (e.g., via a website or application programming interface (API), etc.), and use the ML model 200 to determine an activity trend of an address.

The training process uses unsupervised techniques because the training data is not labelled with expected output (e.g., whether the address is associated with increasing or decreasing activity). Advantageously, therefore, the performance of the ML model 200 is not limited by the quantity of labelled data or the quality of data labels.

It will be understood that the structure of the ML model 200 is just one example and does not necessarily describe every possible embodiment. Alternate embodiments of the ML model 200 may include fewer, alternate, and/or additional elements, and/or be arranged in a different manner.

Example Process of Determining Active/Inactive Metric

As indicated above, upon determining an activity trend of an address, the implementation computing device 102 may determine an active metric or an inactive metric based on the direction of the activity trend. For example, responsive to determining that the address is associated with increasing activity, the implementation computing device 102 determines an active metric for the address. Conversely, responsive to determining that the address is associated with decreasing activity, the implementation computing device 102 determines an inactive metric for the address. In various embodiments, the implementation computing device 102 may treat a neutral activity trend (i.e., neither increasing nor decreasing) the same way as a decreasing trend, the same way as an increasing trend, or in some other suitable manner.

In some embodiments, the active metric and inactive metric are each a weighted sum of component metrics (e.g., z scores), according to the following equations:

$$\text{score}_{active} = \sum_{i=0}^{n} z_i W_{ai} \tag{7}$$

$$\text{score}_{inactive} = -\sum_{i=0}^{n} z_i W_{bi} \tag{8}$$

wherein $\text{score}_{active}$ represents an active metric for an address of a provider, $\text{score}_{inactive}$ represents an inactive metric for an address of a provider, $z_i$ is a z score determined with respect to a particular (i-th) benchmark or provider feature out of n benchmarks or provider features, and $W_{ai}$ and $W_{bi}$ are weight parameters for determining the active metric and the inactive metric, respectively.

Generally, a greater active metric indicates a higher likelihood that an address is active. Similarly, a greater inactive metric indicates a higher likelihood that an address is inactive. An example process of determining the z scores will be described below in connection with FIGS. 3A-4D. An example process of training the weight parameters $W_{ai}$ and $W_{bi}$ will be described below in connection with FIG. 5.

Figure 3A:
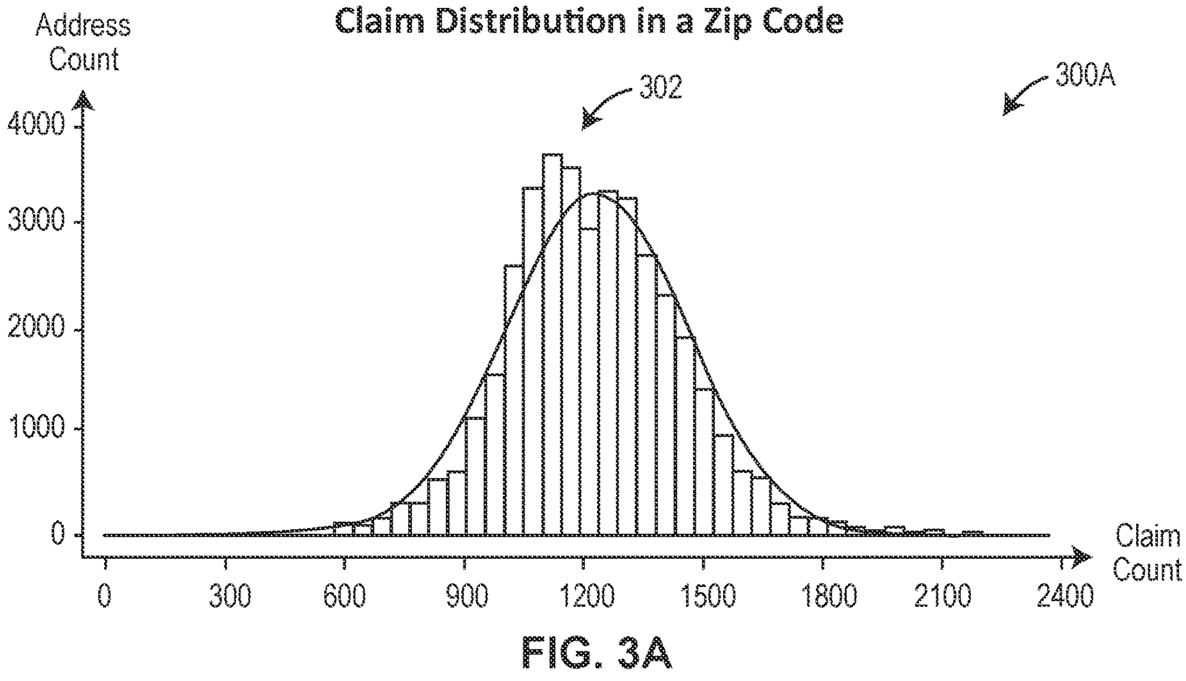
FIG. 3A depicts an example graph of claim distribution associated with a particular zip code.

FIG. 3A depicts an example graph of claim distribution 300A associated with a particular zip code. The horizontal axis represents claim counts that are associated with the zip code and submitted by providers in a particular time period (e.g., month, 6 months, year, etc.). The vertical axis represents the number of unique addresses for a given claim count range/bucket. For example, an example bucket 302 shown in the claim distribution 300A represents that there are about 3600 unique addresses whose associated claim counts fall within the range of 1150 to 1200 in the particular time period and the particular zip code. The implementation computing device 102 may generate the claim distribution 300A automatically based on data obtained by executing the instructions of the information extraction component 122.

Upon obtaining the data representing claim distribution 300A, the implementation computing device 102 may perform regression analysis to generate a standard distribution graph based on the claim distribution 300A. In the example graph of FIG. 3A, the standard distribution is a Gaussian distribution.

Figure 3B:
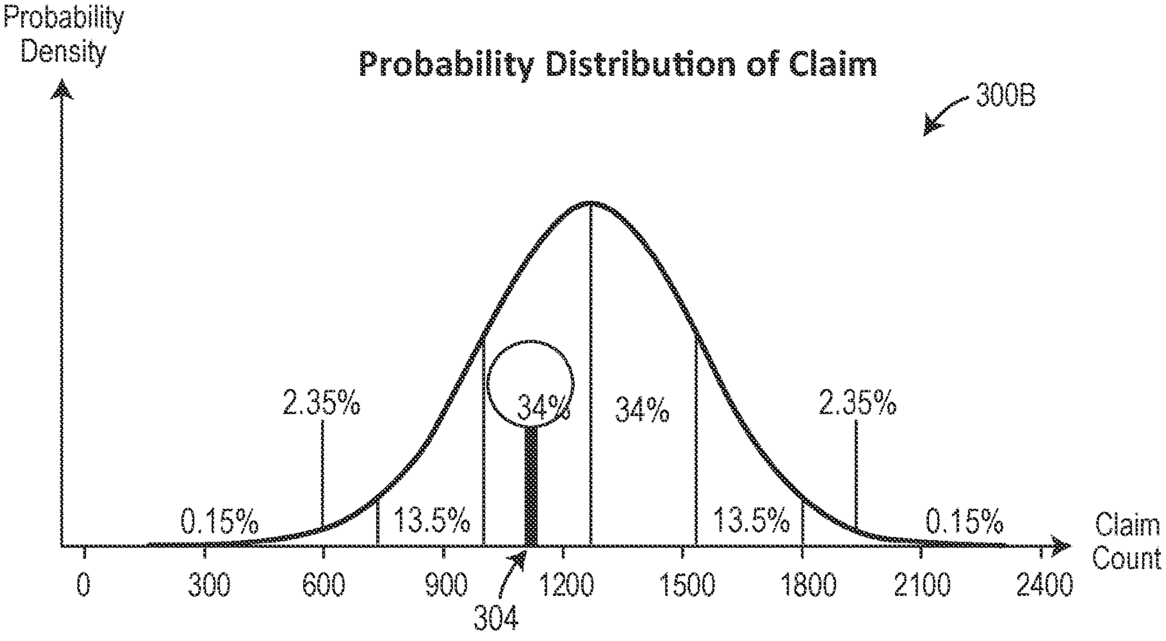
FIG. 3B depicts an example graph of probability distribution of claim counts associated with a particular zip code.

FIG. 3B depicts an example graph of probability distribution 300B of claim counts associated with a particular zip code. The implementation computing device 102 may generate probability distribution 300B by performing regression analysis on the claim distribution 300A. The regression analysis produces parameters of the standard probability distribution, such as a mean value μ and a standard deviation σ. The implementation computing device 102 may determine a z score/metric based on the parameters, which represents how much a claim count of an address deviates from the mean value. More particularly, the implementation computing device 102 may determine the z score using the following equation:

$$z = \frac{x - \mu}{\sigma} \tag{9}$$

wherein x is a claim count associated with an address of a provider submitted in the particular time period, μ is the mean value of the probability distribution, and σ is the standard deviation of the probability distribution. In some embodiments, the implementation computing device 102 generates the probability distribution 300B by normalizing the standard distribution graph described above in connection with FIG. 3A (e.g., such that the mean value μ=0 and the standard deviation σ=1).

As shown in FIG. 3B, the claim count 304 of a particular provider is slightly lower than the mean value of the probability distribution 300B. Accordingly, the z score of the address is a negative number with a relatively small absolute value, indicating that the claim count of the provider is slightly lower than the average claim count of providers associated with the particular zip code.

FIG. 4A depicts an example graph of probability distribution 400A of claim counts associated with a particular tax identifier. The particular tax identifier may be a tax identifier of a medical organization. The implementation computing device 102 may generate the probability distribution 400A in a similar manner as probability distribution 300B. A z score determined based on the claim count 402 indicated in the probability distribution 400A is a negative number with a relatively large absolute value, representing that the claim count of the provider is substantially lower than the average claim count of providers associated with the particular tax identifier.

FIG. 4B depicts an example graph of probability distribution 400B of claim counts associated with a particular specialty. The probability distribution 400B may be generated in a similar manner as probability distribution 300B. A z score determined based on the claim count 404 indicated in the probability distribution 400B is a positive number with a relatively small absolute value, representing that the claim count of the provider is slightly higher than the average claim count of providers of the particular specialty.

FIG. 4C depicts an example graph of probability distribution 400C of claim counts associated with a particular contract. The particular contract may be a medical insurance contract. The probability distribution 400C may be generated in a similar manner as probability distribution 300B. A z score determined based on the claim count 406 indicated in the probability distribution 400C is a positive number with a relatively large absolute value, representing that the claim count of the provider is substantially higher than the average claim count of providers associated with the particular contract.

FIG. 4D depicts an example graph of probability distribution 400D of claim counts associated with a particular line of business. The particular line of business may be a specific category or type of insurance coverage offered to providers or medical organizations. The probability distribution 400D may be generated in a similar manner as probability distribution 300B. A z score determined based on the claim count 408 indicated in the probability distribution 400D is a negative number with a relatively large absolute value, representing that the claim count of the provider is substantially lower than the average claim count of providers associated with the particular line of business.

Upon determining the z scores based on the various benchmarks or provider features (e.g., zip code, tax identifier, specialty, contract, line of business, etc.), the implementation computing device 102 may determine an active metric or an inactive metric according to equation (7) or equation (8), respectively. For example, to determine an active metric (e.g., an active address score), the implementation computing device 102 may plug the z scores in equation (7) in the following manner:

$$\text{score}_{active} = z_{zipcode}W_{a0} + z_{taxID}W_{a1} + z_{specialty}W_{a2} + z_{contract}W_{a3} + z_{LoB}W_{a4} \quad (10)$$

wherein $z_{zipcode}$ is a z score determined based on the probability distribution 300B associated with a particular zip code, $z_{taxID}$ is a z score determined based on the probability distribution 400A associated with a particular tax identifier, $z_{specialty}$ is a z score determined based on the probability distribution 400B associated with a particular specialty, $z_{contract}$ is a z score determined based on the probability distribution 400C associated with a particular contract, $z_{LoB}$ is a z score determined based on the probability distribution 400D associated with a particular line of business, and $W_{a0}$ to $W_{a4}$ are weight parameters corresponding to $z_{zipcode}$, $z_{taxID}$, $z_{specialty}$, $z_{contract}$, and $z_{LoB}$, respectively.

Similarly, to determine an inactive metric (e.g., an inactive address score), the implementation computing device 102 may plug the z scores in equation (8) in the following manner:

$$\text{score}_{active} = -(z_{zipcode}W_{a0} + z_{taxID}W_{a1} + z_{specialty}W_{a2} + z_{contract}W_{a3} + z_{LoB}W_{a4}) \quad (11)$$

wherein $W_{b0}$ to $W_{b4}$ are weight parameters corresponding to $z_{zipcode}$, $z_{taxID}$, $z_{specialty}$, $z_{contract}$, and $z_{LoB}$, respectively. $W_{a0}$ to $W_{a4}$ may be identical to or different than $W_{b0}$ to $W_{b4}$, respectively.

It will be understood that the implementation computing device 102 may determine the active metric and the inactive metric using the same techniques or different techniques. For example, the z scores used to determine the metrics may be based on different types of probability distributions (e.g., chi-squared distribution, Poisson distribution, etc.), the component metrics may correspond to different benchmarks or provider features, etc.

It will be understood that the implementation computing device 102 does not need to generate the probability distributions 300B-400D from scratch every time the implementation computing device 102 determines the z scores. Rather, the implementation computing device 102 may in some embodiments generate the probability distributions 300B-400D just once, store the parameters of the probability distributions 300B-400D, and retrieve the parameters to determine the z scores when needed. Additionally or alternatively, the implementation computing device 102 may update the probability distributions 300B-400D periodically (e.g., monthly, weekly, etc.) such that the z scores determined based on the probability distribution is up to date.

It will be understood that the benchmarks or provider features above are examples and do not necessarily describe every possible embodiment. As such, it will be further understood that alternate embodiments may include fewer, alternate, and/or additional benchmarks or provider features, and/or be arranged in a different manner.

Figure 5:
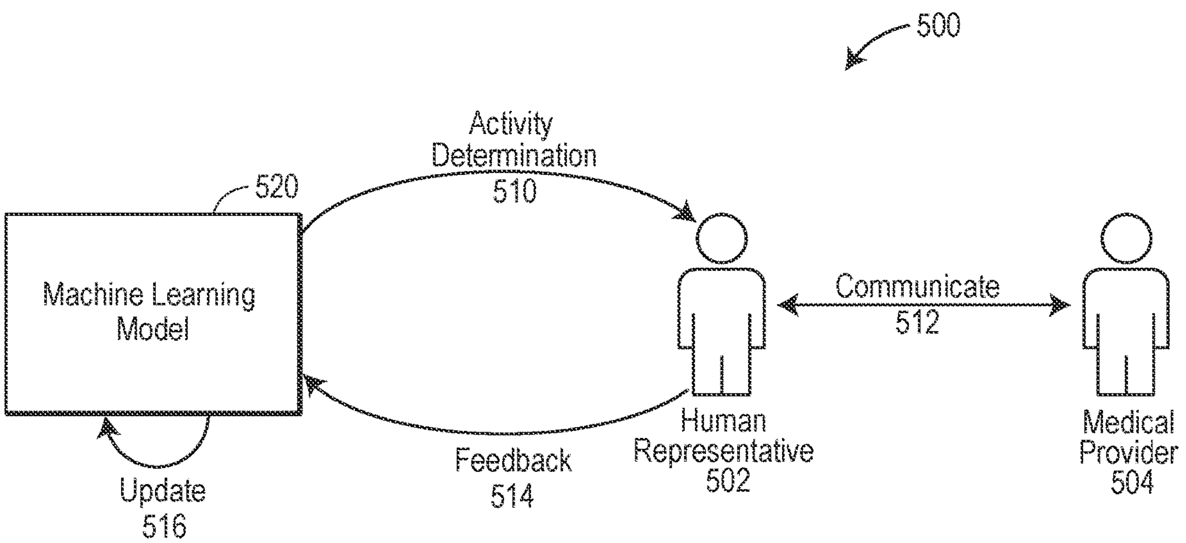
FIG. 5 depicts an example process for training parameters of a machine-learned model using reinforcement learning with human feedback (RLHF) techniques, in accordance with various embodiments described herein.

FIG. 5 depicts an example process 500 for training parameters $W_{ai}$ and/or $W_{bi}$ of a machine-learned model 520 used for determining an active metric or inactive metric (e.g., ML model 200) according to equation (7) or (8), respectively. The example process 500 uses RLHF techniques.

Generally, the training component 152 includes executable instructions to learn a set of parameters $W_{ai}$ and/or $W_{bi}$ that maximizes rewards. The parameters $W_{ai}$ and/or $W_{bi}$ may be initialized by human experts based on domain knowledge or initialized to be random values. The human experts may also set an active metric threshold and an inactive metric threshold based on domain knowledge.

As indicated above, the parameters $W_{ai}$ of equation (7) may be identical to the respective parameters $W_{bi}$ of equation (8). In such embodiments, the inactive metric may be an additive inverse of the active metric, as described by the following equation:

$$\text{score}_{active} = -\text{score}_{inactive} \quad (12)$$

In such embodiments, the absolute value of the active metric threshold is greater than the absolute value of the inactive metric threshold in order to avoid the possibility of an address being determined to be both active and inactive.

To learn a set of parameters W (where parameters $W_{ai}$ and $W_{bi}$ are collectively denoted as W) that maximizes rewards, the implementation computing device 102 may plug z scores into equation (7) with the initial set of parameters W and equation (8) with the initial set of parameters W and determine (510) whether the address is active or inactive based on the scores and the respective score thresholds. After the training computing device 104 determines the address to be active or inactive, a human representative 502 may communicate (512) with a provider 504 associated with the address, and determine whether the determination by the training computing device 104 is correct. If the determination is correct, the human representative 502 may provide feedback (514) indicative of a reward to the ML model 520. Conversely, the determination is incorrect, the human representative 502 may provide feedback (514) indicative of a penalty to the ML model 520. The ML model 520 may then optimize or refine the ML model 520 by updating (516) the set of parameters W based on the reward or penalty.

If the training computing device 104 correctly determines an address to be active or inactive, the human representative 502 may provide the reward feedback (514) to the training computing device 104. The training computing device 104, upon receiving the reward feedback, may maintain the set of parameters W because the current set of parameters W produce the correct result, or increase at least a portion of the set of parameters W that contributes to the correctness of the result and/or decrease at least a portion of the set of parameters W that undermines the correctness of the result. As an example, suppose the training computing device 104 correctly determines the address to be active by plugging in $z_0$=1.5 and $z_1$=−0.5 into equation (7) as follows:

$$\begin{aligned} \text{score}_{active} &= \sum_{i=0}^{n} z_i W_i \\ &= z_0 W_0 + z_1 W_1 \\ &= 1.5 W_0 - 0.5 W_1 \end{aligned} \tag{13}$$

Upon receiving a reward, the training computing device 104 may maintain the values of the $W_0$ and $W_1$. Alternatively, the training computing device 104 may increase $W_0$ as it contributes to the correctness of the result, and/or decrease $W_1$ as it undermines the correctness of the result.

If the training computing device 104 instead incorrectly determines an address to be active or inactive, the human representative 502 may provide penalty feedback (514) to the training computing device 104. The training computing device 104, upon receiving the penalty feedback, may decrease at least a portion of the set of parameters W that contributes to the incorrectness of the result and/or increase at least a portion of the set of parameters W that undermines the incorrectness of the result. As an example, suppose the training computing device 104 incorrectly determines the address to be active by plugging in $z_0$=1.5, $z_1$=0.5, $z_2$=−0.5, $z_3$=−1.5, into equation (7) as follows:

$$\begin{aligned} \text{score}_{active} &= \sum_{i=0}^{n} z_i W_i \\ &= z_0 W_0 + z_1 W_1 + z_2 W_2 + z_3 W_3 \\ &= 1.5 W_0 + 0.5 W_1 - 0.5 W_2 - 1.5 W_3 \end{aligned} \tag{14}$$

Upon receiving a penalty, the training computing device 104 may decrease $W_0$ and $W_1$ as they contribute to the incorrectness of the result, and/or increase $W_2$ and $W_3$ as they undermine the incorrectness of the result. Alternatively, the training computing device 104 may decrease a portion of $W_0$ and $W_1$. For example, the training computing device 104 may decrease $W_0$ only, as it makes the greatest contribution to the incorrectness of the result. Similarly, the training computing device 104 may increase $W_3$ only as it makes the greatest contribution to help correct the result.

After the determination made of the ML model 520 achieves a predetermined accuracy rate, the ML model 520 may be considered sufficiently trained, and may be retrieved and/or accessed (e.g., remotely accessed) by implementation computing device 102 for determining the active or inactive metrics when needed.

It is possible, in some embodiments, that an address can be neither active nor inactive based on the scores, unless the active metric threshold is exactly an additive inverse of the inactive metric threshold. That is, an active metric of the address may be less than the active metric threshold, and an inactive metric of the address may be less than the inactive metric threshold. In such cases, the implementation computing device 102 may determine the address to be inactive, or may flag the address for manual review, as will be described in detail in connection with FIG. 6.

As indicated above, the parameters $W_a$ of equation (7) may be different than the respective parameters $W_b$ of equation (8). In such scenarios, an active metric is not necessarily an additive inverse of the inactive metric. While training the parameters $W_a$ and $W_b$, there are four possible cases and the parameter $W_a$ and $W_b$ may be updated in the following manner.

As a first case, the training computing device 104 may determine that the address is active because an active metric determined by equation (7) is greater than the active metric threshold and an inactive metric determined by equation (8) is less than the inactive metric threshold. If the address is active based on the communication (512) with the provider (504), the training computing device 104 may maintain the current values of the parameters $W_a$ and $W_b$, or increase at least a portion of the parameters $W_a$ and $W_b$ that contributes to the correctness of the result and/or decrease at least a portion of the parameters $W_a$ and $W_b$ that undermines the correctness of the result, in a similar manner as described above. Conversely, if the address is inactive, the training computing device 104 may decrease at least a portion of the parameters $W_a$ and $W_b$ that contributes to the incorrectness of the result and/or increase at least a portion of the parameters $W_a$ and $W_b$ that undermines the incorrectness of the result, in a similar manner as described above.

As a second case, the training computing device 104 may determine that the address is inactive because an active metric determined by equation (7) is less than the active metric threshold and an inactive metric determined by equation (8) is greater than the inactive metric threshold. If the address is inactive based on the communication (512) with the provider (504), the training computing device 104 may maintain the current values of the parameters $W_a$ and $W_b$, or increase at least a portion of the parameters $W_a$ and $W_b$ that contributes to the correctness of the result and/or decrease at least a portion of the parameters $W_a$ and $W_b$ that undermines the correctness of the result, in a similar manner as described above. Conversely, if the address is active, the training computing device 104 may decrease at least a portion of the parameters $W_a$ and $W_b$ that contributes to the incorrectness of the result and/or increase at least a portion of the parameters $W_a$ and $W_b$ that undermines the incorrectness of the result, in a similar manner as described above.

As a third case, the training computing device 104 may determine that (i) the address is active because an active address score determined by equation (7) is greater than the active metric threshold and (ii) the address is also inactive because an inactive address score determined by equation (8) is greater than the inactive metric threshold. If the address is active based on the communication (512) with the provider (504), the training computing device 104 may (i) maintain the current values of the parameters $W_a$, or increase at least a portion of the parameters $W_a$ that contributes to the correctness of the result and/or decrease at least a portion of the parameters $W_a$ that undermines the correctness of the result, in a similar manner as described above, and (ii) decrease at least a portion of the parameters $W_b$ that contributes to the incorrectness of the result and/or increase at least a portion of the parameters $W_b$ that undermines the incorrectness of the result, in a similar manner as described above. Conversely, if the address is inactive, the training computing device 104 may (i) maintain the current values of the parameters $W_b$, or increase at least a portion of the parameters $W_b$ that contributes to the correctness of the result and/or decrease at least a portion of the parameters $W_b$ that undermines the correctness of the result, in a similar manner as described above, and (ii) decrease at least a portion of the parameters $W_a$ that contributes to the incorrectness of the result and/or increase at least a portion of the parameters $W_a$ that undermines the incorrectness of the result, in a similar manner as described above. To be noted, although it is possible that an address is determined to be both active and inactive while training the ML model 520, this scenario should not occur after the ML model 520 is sufficiently trained.

As a fourth case, the training computing device 104 may determine that (i) the address is not active because an active metric determined by equation (7) is less than the active metric threshold and (ii) the address is also not inactive because an inactive metric determined by equation (8) is less than the inactive metric threshold. If the address is active based on the communication (512) with the provider (504), the training computing device 104 may (i) decrease at least a portion of the parameters $W_a$ that contributes to the incorrectness of the result and/or increase at least a portion of the parameters $W_a$ that undermines the incorrectness of the result, in a similar manner as described above, and (ii) maintain the current values of the parameters $W_b$, or increase at least a portion of the parameters $W_b$ that contributes to the correctness of the result and/or decrease at least a portion of the parameters $W_b$ that undermines the correctness of the result, in a similar manner as described above. Conversely, if the address is inactive, the training computing device 104 may (i) maintain the current values of the parameters $W_a$, or increase at least a portion of the parameters $W_a$ that contributes to the correctness of the result and/or decrease at least a portion of the parameters $W_a$ that undermines the correctness of the result, in a similar manner as described above, and (ii) decrease at least a portion of the parameters $W_b$ that contributes to the incorrect result and/or increase at least a portion of the parameters $W_b$ that undermines the incorrectness of the result, in a similar manner as described above.

After the determination made by the ML model 520 achieves a predetermined accuracy rate, the parameters W may be considered sufficiently trained, and may be retrieved by implementation computing device 102 for determining the active or inactive metrics when needed.

It is possible, in some embodiments, that an address can be neither active nor inactive based on the scores. In such cases, the implementation computing device 102 may determine the address to be inactive, or may flag the address for manual review, as will be described in detail in connection with FIG. 6.

Example Process of Determining Whether an Address is Active

Figure 6:
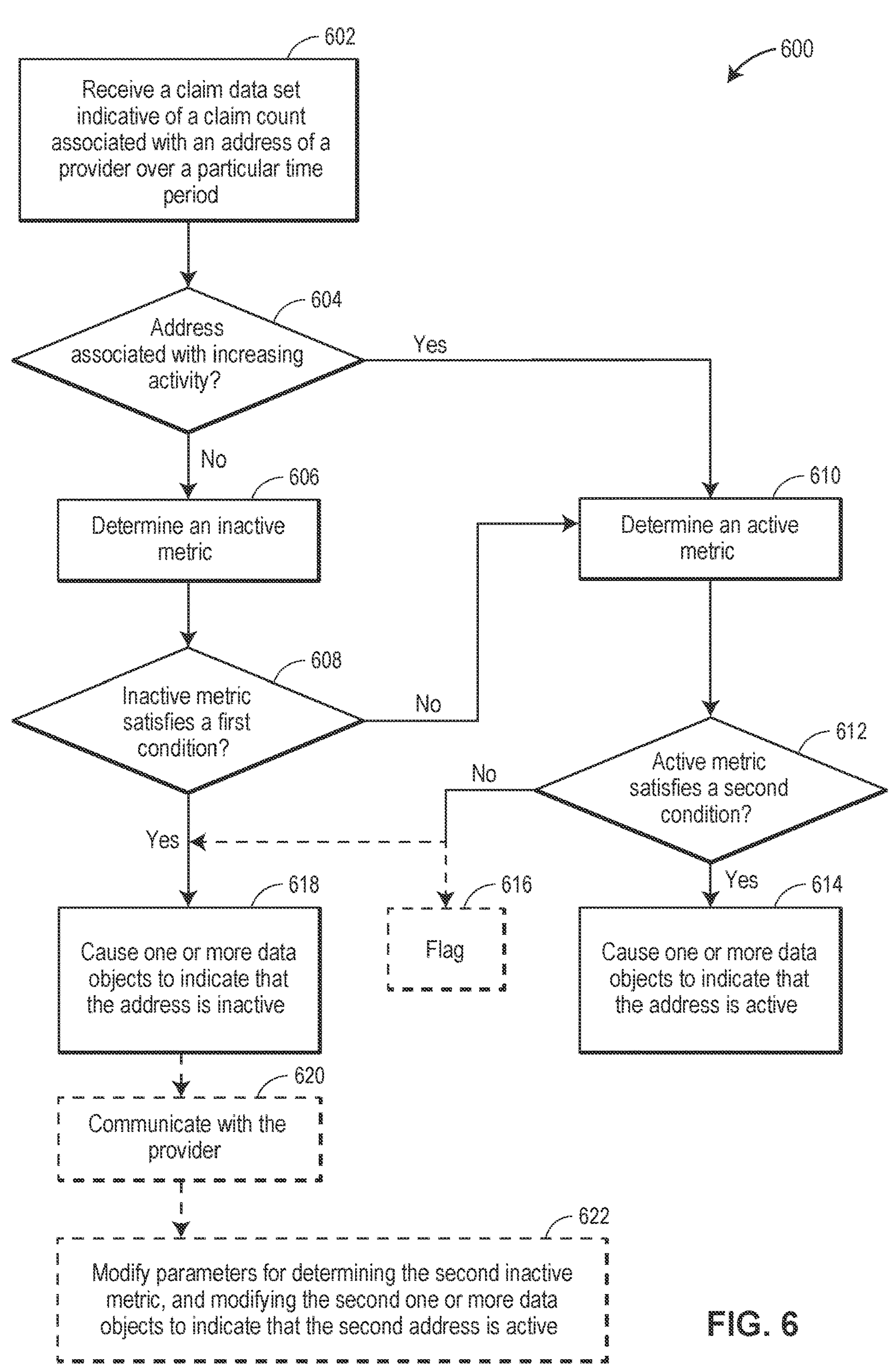
FIG. 6 depicts an example process for determining whether an address of a provider is active or inactive, in accordance with various embodiments described herein.

FIG. 6 depicts an example process 600 for determining whether an address of a provider is active or inactive, in accordance with various embodiments described herein. The process 600 may be implemented by one or more processors and/or devices of the example computing system 100, such as the implementation computing device 102 (e.g., by processor(s) 112 when executing instructions stored in memory 114).

The process 600 includes receiving a claim data set indicative of a claim count associated with an address of a provider over a particular time period (block 602). In some embodiments, receiving the claim data set includes retrieving the claim data set from the insurance document database 106.

The process 600 includes determining whether the address is associated with increasing activity or decreasing activity (block 604). The determination is based at least in part on the claim data set, e.g., as described in above in connection with FIG. 2. In some embodiments, the increasing activity or the decreasing activity is determined using LSTM techniques, as described above in connection with FIG. 2.

The process 600 includes, responsive to determining (block 604) that the address is associated with decreasing activity, determining an inactive metric for the address using unsupervised learning techniques and based at least in part on the claim data set (block 606). Additionally, the process 600 includes, responsive to determining (block 604) that the address is associated with increasing activity, determining an active metric for the address using unsupervised learning techniques and based at least in part on the claim data set (block 610).

In some embodiments, the claim data set is a first claim data set, and determining the inactive metric or active metric includes (i) obtaining, by the one or more processors, a second claim data set indicative of (a) claim counts associated with a plurality of addresses, respectively, and (b) one or more features of a plurality of providers; (ii) generating, by the one or more processors, one or more distribution graphs of the claim counts with respect to corresponding ones of the one or more features; (iii) determining, by the one or more processors, parameters of the one or more distribution graphs; (iv) determining, by the one or more processors using the parameters, one or more component metrics corresponding to respective ones of the one or more distribution graphs; and (v) determining, by the one or more processors, the active metric or inactive metric using the component metrics and one or more weights corresponding to respective ones of the one or more component metrics, e.g., as described above in connection with FIGS. 3A-4D. In some embodiments, obtaining a second claim data set includes matching addresses extracted from insurance document again addresses retrieved from the insurance document database 106 and determining the addresses to be the addresses of the providers if they match, e.g., as described above in connection with FIG. 1. In some embodiments, each of the component metrics corresponds to a respective benchmark or provider feature of the claims (e.g., zip code, tax identifier, specialty, contract, line of business, etc.), e.g., as described above in connection with FIGS. 3A-4D.

In some embodiments, the parameters of a distribution graph of the one or more distribution graphs include a mean value μ and a standard deviation δ, and a component metric of the one or more component metrics is a z score, determined by:

$$z = (x - \mu)/\delta \quad (15)$$

wherein x is the claim count associated with the address of the provider, e.g., as described above in connection with FIGS. 3A-4D.

In some embodiments, determining the parameters of the one or more distribution graphs includes regressing the distribution graphs to obtain one or more respective standard distribution graphs, and determining the parameters based on the one or more standard distribution graphs, as described above in connection with FIGS. 3A-4D. In some embodiments, at least one of the one or more standard distribution graphs is a Gaussian distribution.

In some embodiments, the inactive metric or active metric is a weighted sum of the one or more component metrics and the one or more weights, e.g., as described above in connection with FIGS. 3A-4D. In some embodiments, the process 600 includes determining the one or more weights using reinforcement learning from human feedback (RLHF) techniques, e.g., as described above in connection with FIG. 5.

The process 600 includes determining whether the inactive metric satisfies a first condition (block 608). The process 600 includes, responsive to determining that the inactive metric fails satisfy the first condition, determining an active metric for the address using unsupervised learning techniques and based at least in part on the claim data set (block 610). The process 600 includes, responsive to determining that the inactive metric satisfies the first condition, causing one or more data objects to indicate that the address is inactive (block 618). In some embodiments, the first condition is that the inactive metric is above an inactive metric threshold.

The process 600 includes determining whether the active metric satisfies a second condition (block 612). The process 600 includes, responsive to determining that the active metric satisfies the second condition, causing one or more data objects to indicate that the address is active (block 614). In some embodiments, the second condition is that the inactive metric is above an active metric threshold. The process 600 includes, in some embodiments, responsive to determining that the active metric fails to satisfy the second condition, causing one or more data objects to indicate that the address is inactive (block 618). The process 600 includes, in some embodiments, responsive to determining that the active metric fails to satisfy the second condition, flagging the address for manual review (block 616).

The process 600 includes, in some embodiments, responsive to determining the address to be inactive, initiating a communication (e.g., by a human representative) with the provider to determine whether the address is indeed inactive (block 620). The process 600 includes, in some embodiments, responsive to determining that the address is active based feedback from the communication, modifying the parameters (e.g., weights) for determining the active or inactive metric (e.g., in a similar manner as described in connection with FIG. 5), and modifying the one or more data objects to indicate that the second address is active (block 622).

In some embodiments and scenarios, the claim data set is a first claim data set indicative of a first claim count associated with a first address of a first provider over the particular time period, the particular time period is a first particular time period, the inactive metric is a first inactive metric, the active metric is a first active metric, the one or more data objects are a first one or more data objects, and the process 600 further includes: (i) receiving a second claim data set indicative of a second claim count associated with a second address of a second provider over a second particular time period, in a similar manner as described in connection with block 602; (ii) determining that the second address is associated with increasing activity based at least in part on the second claim data set, in a similar manner as described in connection with block 604; (iii) responsive to determining that the second address is associated with increasing activity, determining a second active metric for the second address using unsupervised learning techniques and based at least in part on the second claim data set, in a similar manner as described in connection with block 610; (iv) determining that the second active metric satisfies a third condition; and (v) responsive to determining that the second active metric satisfies the third condition, causing a second one or more data objects to indicate that the second address is active, in a similar manner as described in connection with block 614. The second particular time period may be the same as or different than the first particular time period. The third condition may be the same as or different than the second condition.

In some embodiments and scenarios, the claim data set is a first claim data set indicative of a first claim count associated with a first address of a first provider over the particular time period, the particular time period is a first particular time period, the inactive metric is a first inactive metric, the active metric is a first active metric, the one or more data objects are first one or more data objects, and the process 600 further includes: (i) receiving a second claim data set indicative of a second claim count associated with a second address of a second provider over the second particular time period, in a similar manner as described in connection with block 602; (ii) determining that the second address is associated with decreasing activity based at least in part on the second claim data se, in a similar manner as described in connection with block 604; (iii) responsive to determining that the second address is associated with decreasing activity, determining a second inactive metric for the second address using unsupervised learning techniques and based at least in part on the second claim data set, in a similar manner as described in connection with block 606; (iv) determining that the second inactive metric satisfies a third condition, in a similar manner as described in connection with block 608; and (v) responsive to determining that the second inactive metric satisfies the third condition, causing a second one or more data objects to indicate that the second address is inactive, in a similar manner as described in connection with block 618. The second particular time period may be the same as or different than the first particular time period. The third condition may be the same as or different than the first condition.

EXAMPLES

Example 1. A system comprising one or more processors; and one or more memories storing processor-executable instructions that, when executed by the one or more processors, cause the one or more processors to perform operations comprising: receiving a claim data set indicative of a claim count associated with an address of a provider over a particular time period; determining that the address is associated with decreasing activity based at least in part on the claim data set; responsive to determining that the address is associated with decreasing activity, determining an inactive metric for the address using unsupervised learning techniques and based at least in part on the claim data set; determining that the inactive metric fails to satisfy a first condition; responsive to determining that the inactive metric fails to satisfy the first condition, determining an active metric for the first address using unsupervised learning techniques and based at least in part on the claim data set; determining that the active metric satisfies a second condition; and responsive to determining that the active metric satisfies the second condition, causing one or more data objects to indicate that the address is active.

Example 2. The system of Example 1, wherein the claim data set is a first claim data set, and determining the active metric includes: obtaining a second claim data set indicative of (i) claim counts associated with a plurality of addresses, respectively, and (ii) one or more features of a plurality of providers; generating one or more distribution graphs of the claim counts with respect to corresponding ones of the one or more features; determining parameters of the one or more distribution graphs; determining, using the parameters, one or more component metrics corresponding to respective ones of the one or more distribution graphs; and determining the active metric using the component metrics and one or more weights corresponding to respective ones of the one or more component metrics.

Example 3. The system of any of Example 1 or 2, wherein: the parameters of a distribution graph of the one or more distribution graphs include a mean value $\mu$ and a standard deviation $\delta$; a component metric of the one or more component metrics is a z score, determined by $z=(x-\mu)/\sigma$; and x is the claim count associated with the address of the provider.

Example 4. The system of any of Examples 1 to 3, wherein determining the parameters of the one or more distribution graphs includes: regressing the distribution graphs to obtain one or more respective standard distribution graphs; and determining the parameters based on the one or more standard distribution graphs.

Example 5. The system of any of Examples 1 to 4, wherein at least one of the one or more standard distribution graphs is a Gaussian distribution.

Example 6. The system of any of Examples 1 to 5, wherein the active metric is a weighted sum of the one or more component metrics and the one or more weights.

Example 7. The system of any of Examples 1 to 6, wherein the processor-executable instructions, when executed by the one or more processors, cause the one or more processors to perform operations comprising: determining the one or more weights using reinforcement learning from human feedback (RLHF) techniques.

Example 8. The system of any of Examples 1 to 7, wherein the claim data set is a first claim data set indicative of a first claim count associated with a first address of a first provider over the particular time period, the particular time period is a first particular time period, the inactive metric is a first inactive metric, the active metric is a first active metric, the one or more data objects are a first one or more data objects, and the processor-executable instructions, when executed by the one or more processors, cause the one or more processors to perform operations comprising: receiving a second claim data set indicative of a second claim count associated with a second address of a second provider over a second particular time period; determining that the second address is associated with increasing activity based at least in part on the second claim data set; responsive to determining that the second address is associated with increasing activity, determining a second active metric for the second address using unsupervised learning techniques and based at least in part on the second claim data set; determining that the second active metric satisfies a third condition; and responsive to determining that the second active metric satisfies the third condition, causing a second one or more data objects to indicate that the second address is active.

Example 9. The system of any of Examples 1 to 8, wherein the claim data set is a first claim data set indicative of a first claim count associated with a first address of a first provider over the particular time period, the particular time period is a first particular time period, the inactive metric is a first inactive metric, the active metric is a first active metric, the one or more data objects are first one or more data objects, and the processor-executable instructions, when executed by the one or more processors, cause the one or more processors to perform operations comprising: receiving a second claim data set indicative of a second claim count associated with a second address of a second provider over a second particular time period; determining that the second address is associated with decreasing activity based at least in part on the second claim data set; responsive to determining that the second address is associated with decreasing activity, determining a second inactive metric for the second address using unsupervised learning techniques and based at least in part on the second claim data set; determining that the second inactive metric satisfies a third condition; and responsive to determining that the second inactive metric satisfies the third condition, causing a second one or more data objects to indicate that the second address is inactive.

Example 10. The system of any of Examples 1 to 9, wherein the processor-executable instructions, when executed by the one or more processors, cause the one or more processors to perform operations comprising: responsive to determining the second address to be inactive, initiating a communication with the provider; responsive to receiving, from the communication, feedback indicative of the address being active, modifying parameters for determining the second inactive metric, and modifying the second one or more data objects to indicate that the second address is active.

Example 11. A method comprising: receiving, by one or more processors, a claim data set indicative of a claim count associated with an address of a provider over a particular time period; determining, by the one or more processors, that the address is associated with decreasing activity based at least in part on the claim data set; responsive to determining that the address is associated with decreasing activity, determining, by the one or more processors, an inactive metric for the address using unsupervised learning techniques and based at least in part on the claim data set; determining, by the one or more processors, that the inactive metric fails to satisfy a first condition; responsive to determining that the inactive metric fails to satisfy the first condition, determining, by the one or more processors, an active metric for the first address using unsupervised learning techniques and based at least in part on the claim data set; determining, by the one or more processors, that the active metric satisfies a second condition; and responsive to determining that the active metric satisfies the second condition, causing, by the one or more processors, one or more data objects to indicate that the address is active.

Example 12. The method of Example 11, wherein the claim data set is a first claim data set, and determining the active metric includes: obtaining, by the one or more processors, a second claim data set indicative of (i) claim counts associated with a plurality of addresses, respectively, and (ii) one or more features of a plurality of providers; generating, by the one or more processors, one or more distribution graphs of the claim counts with respect to corresponding ones of the one or more features; determining, by the one or more processors, parameters of the one or more distribution graphs; determining, by the one or more processors and using the parameters, one or more component metrics corresponding to respective ones of the one or more distribution graphs; and determining, by the one or more processors, the active metric using the component metrics and one or more weights corresponding to respective ones of the one or more component metrics.

Example 13. The method of Example 11 or 12, wherein: the parameters of a distribution graph of the one or more distribution graphs include a mean value μ and a standard deviation δ; a component metric of the one or more component metrics is a z score, determined by $z=(x-\mu)/\sigma$; and x is the claim count associated with the address of the provider.

Example 14. The method of any of Examples 11 to 13, wherein determining the parameters of the one or more distribution graphs includes: regressing, by the one or more processors, the distribution graphs to obtain one or more respective standard distribution graphs; and determining, by the one or more processors, the parameters based on the one or more standard distribution graphs.

Example 15. The method any of Examples 11 to 14, wherein at least one of the one or more standard distribution graphs is a Gaussian distribution.

Example 16. The method of any of Examples 11 to 15, wherein the active metric is a weighted sum of the one or more component metrics and the one or more weights.

Example 17. The method of any of Examples 11 to 16, further comprising: determining, by the one or more processors, the one or more weights using reinforcement learning from human feedback (RLHF) techniques.

Example 18. The method of any of Examples 11 to 17, wherein the claim data set indicative of the claim count associated with the address of the provider over the particular time period is a first claim data set indicative of a first claim count associated with a first address of a first provider over the particular time period, the particular time period is a first particular time period, the inactive metric is a first inactive metric, the active metric is a first active metric, the one or more data objects are a first one or more data objects, the method further comprising: receiving, by the one or more processors, a second claim data set indicative of a second claim count associated with a second address of a second provider over a second time period; determining, by the one or more processors, that the second address is associated with increasing activity based at least in part on the second claim data set; responsive to determining that the second address is associated with increasing activity, determining, by the one or more processors, a second active metric for the second address using unsupervised learning techniques and based at least in part on the second claim data set; determining, by the one or more processors, that the second active metric satisfies a third condition; responsive to determining that the second active metric satisfies the third condition, causing, by the one or more processors, a second one or more data objects to indicate that the second address is active.

Example 19. The method of any of Examples 11 to 18, wherein the claim data set indicative of the claim count associated with the address of the provider over the particular time period is a first claim data set indicative of a first claim count associated with a first address of a first provider over the particular time period, the particular time period is a first particular time period, the inactive metric is a first inactive metric, the active metric is a first active metric, the one or more data objects are first one or more data objects, the method further comprising: receiving, by the one or more processors, a second claim data set indicative of a second claim count associated with a second address of a second provider over a second time period; determining, by the one or more processors, that the second address is associated with decreasing activity based at least in part on the second claim data set; responsive to determining that the second address is associated with decreasing activity, determining, by the one or more processors, a second inactive metric for the second address using unsupervised learning techniques and based at least in part on the second claim data set; determining, by the one or more processors, that the second inactive metric satisfies the first condition; and responsive to determining that the second inactive metric satisfies the first condition, causing, by the one or more processors, a second one or more data objects to indicate that the second address is inactive.

Example 20. The method of any of Examples 11 to 19, further comprising: responsive to determining the second address to be inactive, initiating, by the one or more processors, a communication with the provider; responsive to receiving, from the communication, feedback indicative of the address being active, modifying, by the one or more processors, parameters for determining the second inactive metric, and modifying, by the one or more processors, the second one or more data objects to indicate that the second address is active.

ADDITIONAL CONSIDERATIONS

Throughout this specification, components, operations, or structures described as a single instance may be implemented as multiple instances. Although individual operations of one or more methods (or processes, techniques, routines, etc.) are illustrated and described as separate operations, two or more of the individual operations may be performed concurrently or otherwise in parallel, and nothing requires that the operations be performed in the order illustrated. Structures and functionality (e.g., operations, steps, blocks) presented as separate components in example configurations may be implemented as a combined structure, functionality, or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, operations, blocks, or instructions. These may constitute and/or be implemented by software (e.g., code embodied on a non-transitory, machine-readable medium), hardware, or a combination thereof. In hardware, the routines, etc., may represent tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware component that operates to perform certain operations as described herein.

In various embodiments, a hardware component may be implemented mechanically or electronically. For example, a hardware component may comprise dedicated circuitry or logic that is permanently configured (e.g., as a special-purpose processor, such as a field programmable gate array (FPGA) or an application-specific integrated circuit (ASIC)) to perform certain operations. A hardware component may also or instead comprise programmable logic or circuitry (e.g., as encompassed within one or more general-purpose processors and/or other programmable processor(s)) that is temporarily configured by software to perform certain operations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where the hardware components include a general-purpose processor configured using software, the general-purpose processor may be configured as respective different hardware components at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple of such hardware components exist contemporaneously, communications may be achieved through signal transmission (e.g., over appropriate circuits and buses) that connect the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

As noted above, the various operations of example methods (or processes, techniques, routines, etc.) described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions. The components referred to herein may, in some example embodiments, comprise processor-implemented components.

Moreover, each operation of processes illustrated as logical flow graphs may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

The terms "coupled" and "connected," along with their derivatives, may be used. In particular embodiments, "connected" may be used to indicate that two or more elements are in direct physical or electrical contact with each other, although the context in the description may dictate otherwise when it is apparent that two or more elements are not in direct physical or electrical contact. "Coupled" may mean that two or more elements are in direct physical or electrical contact. However, "coupled" may also mean that two or more elements are not in direct contact with each other, yet still co-operate, transmit between, or interact with each other.

An algorithm may be considered to be a self-consistent sequence of acts or operations leading to a desired result. These include physical manipulations of physical quantities. Usually, though not necessarily, these quantities take the form of electrical, magnetic, or optical signals capable of being stored, transferred, combined, compared, and otherwise manipulated. These signals are commonly referred to as bits, values, elements, symbols, characters, terms, numbers, flags, or the like. It should be understood, however, that all of these and similar terms are to be associated with the appropriate physical quantities and are merely convenient labels applied to these quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments," "one embodiment," "an embodiment," "in some examples," or variations thereof means that a particular element, feature, structure, characteristic, operation, or the like described in connection with the embodiment is included in at least one embodiment, but not every embodiment necessarily includes the particular element, feature, structure, characteristic, operation, or the like. Different instances of such a reference in various places in the specification do not necessarily all refer to the same embodiment, although they may in some cases. Moreover, different instances of such a reference may describe elements, features, structures, characteristics, operations, or the like be combined in any manner as an embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless the context of use clearly indicates otherwise, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "set" is intended to mean a collection of elements and can be a null set (i.e., a set containing zero elements) or may comprise one, two, or more elements. A "subset" is intended to mean a collection of elements that are all elements of a set, but that does not include other elements of the set. A first subset of a set may comprise zero, one, or more elements that are also elements of a second subset of the set. The first subset may be said to be a subset of the second subset if all the elements of the first subset are elements of the second subset, while also being a subset of the set. However, if all the elements of the second subset are also elements of the first subset (in addition to all the elements of the first subset being elements of the second subset), the first subset and the second subset are a single subset/not distinct.

For the purposes of the present disclosure, the term "a" or "an" entity refers to one or more of that entity. As such, the terms "a" or "an", "one or more", and "at least one" can be used interchangeably herein unless explicitly contradicted by the specification using the word "only one" or similar. For example, "a first element" may functionally be interpreted as "a first one or more elements" or a "first at least one element." Unless otherwise apparent from the context of use, reference in the present disclosure to a same set of "one or more processors" (or a same "plurality of processors," etc.) performing multiple operations can encompass implementations in which performance of the operations is divided among the processor(s) in any suitable way. For example, "generating, by one or more processors, X; and generating, by the one or more processors, Y" can encompass: (1) implementations in which a first subset of the processors (e.g., in a first computing device) generates X and an entirely distinct, second subset of the processors (e.g., in a different, second computing device) independently generates Y; (2) implementations in which one or more or all of the processor(s) (e.g., one or multiple processors in the same device, or multiple processors distributed among multiple devices) contribute to the generation of X and/or Y; and (3) other variations. This may similarly be applied to any other component or feature similarly recited (e.g., as "a component", "a feature", "one or more components", "one or more features", "a plurality of components", "a plurality of features"). Moreover, the performance of certain of the operations may be distributed among the one or more components, not only residing within a single machine, but deployed across a number of machines. The set of components may be located in a single geographic location (e.g., within a home environment, an office environment, a cloud environment). In other example embodiments, the set of components may be distributed across two or more geographic locations. Further, "a machine-learned model", equivalent terms (e.g., "machine learning model," "machine-learning model," "machine-learned component", "artificial intelligence", "artificial intelligence component"), or species thereof (e.g., "a large language model", "a neural network") may include a single machine-learned model or multiple machine-learned models, such as a pipeline comprising two or more machine-learned models arranged in series and/or parallel, an agentic framework of machine-learned models, or the like.

An "artificial intelligence" or "artificial intelligence component" may comprise a machine-learned model. A machine-learned model may comprise a hardware and/or software architecture having structural hyperparameters defining the model's architecture and/or one or more parameters (e.g., coefficient(s), weight(s), biase(s), activation function(s) and/or action function type(s) in examples where the activation function and/or function type is determined as part of training, clustering centroid(s)/medoid(s), partition(s), number of trees, tree depth, split parameters) determined as a result of training the machine-learned model based at least in part on training hyperparameters (e.g., for supervised, semi-supervised, and reinforcement learning models) and/or by iteratively operating the machine-learned model according to the training hyperparameters(e.g., for unsupervised machine-learned models).

In some examples, structural hyperparameter(s) may define component(s) of the model's architecture and/or their configuration/order, such as, for example, the configuration/order specifying which input(s) are provided to one component and which output(s) of that component are provided as input to other component(s) of the machine-learned model; a number, type, and/or configuration of component(s) per layer; a number of layers of the model; a number and/or type of input nodes in an input layer of the model; a number and/or type of nodes in a layer; a number and/or type of output nodes of an output layer of the model; component dimension (e.g., input size versus output size); a number of trees; a maximum tree depth; node split parameters; minimum number of samples in a leaf node of a tree; and/or the like. The component(s) of the model may comprise one or more activation functions and/or activation function type(s) (e.g., gated linear unit (GLU), such as a rectified linear unit (ReLU), leaky RELU, Gaussian error linear unit (GELU), Swish, hyperbolic tangent), one or more attention mechanism and/or attention mechanism types (e.g., self-attention, cross-attention), nodes and split indications and/or probabilities in a decision tree, and/or various other component(s) (e.g., adding and/or normalization layer, pooling layer, filter). Various combinations of any these components (as defined by the structural hyperparameter(s)) may result in different types of model architectures, such as a transformer-based machine-learned model (e.g., encoder-only model(s), encoder-decoder model(s), decoder-only models, generative pre-trained transformer(s) (GPT(s))), neural network(s), multi-layer perceptron(s), Kolmogorov-Arnold network(s), clustering algorithm(s), support vector machine(s), gradient boosting machine(s), and/or the like. The structural parameters and components a machine-learned model comprises may vary depending on the type of machine-learned model.

Training hyperparameter(s) may be used as part of training or otherwise determining the machine-learned model. In some examples, the training hyperparameter(s), in addition to the training data and/or input data, may affect determining the parameter(s) of the target machine-learned model. Using a different set of training hyperparameters to train two machine-learned models that have the same architecture (i.e., the same structural hyperparameters) and using the same training data may result in the parameters of the first machine-learned model differing from the parameters of the second machine-learned model. Despite having the same architecture and having been trained using the same training data, such machine-learned models may generate different outputs from each other, given the same input data. Accordingly, accuracy, precision, recall, and/or bias may vary between such machine-learned models.

In some examples, training hyperparameter(s) may include a train-test split ratio, activation function and/or activation function type (e.g., in examples like Kolmogorov-Arnold networks (KANs) where the activation function type is determined as part of training from an available set of activation functions and/or limits on the activation function parameters specified by the training hyperparameters), training stage(s) (e.g., using a first set of hyperparameters for a first epoch of training, a second set of hyperparameters for a second epoch of training), a batch size and/or number of batches of data in a training epoch, a number of epochs of training, the loss function used (e.g., L1, L2, Huber, Cauchy, cross entropy), the component(s) of the machine-learned model that are altered using the loss for a particular batch or during a particular epoch of training (e.g., some components may be "frozen," meaning their parameters are not altered based on the loss), learning rate, learning rate optimization algorithm type (e.g., gradient descent, adaptive, stochastic) used to determine an alteration to one or more parameters of one or more components of the machine-learned model to reduce the loss determined by the loss function, learning rate scheduling, and/or the like.

In some examples, the structural hyperparameters and/or the training hyperparameters may be determined by a hyperparameter optimization algorithm or based on user input, such as a software component written by a user or generated by a machine-learned model. The machine-learned model may include any type of model configured, trained, and/or the like to generate a prediction output for a model input. In some examples, any of the logic, component(s), routines, and/or the like discussed herein may be implemented as a machine-learned model.

The machine-learned model may include one or more of any type of machine-learned model including one or more supervised, unsupervised, semi-supervised, and/or reinforcement learning models. Training a machine-learned model may comprise altering one or more parameters of the machine-learned model (e.g., using a loss optimization algorithm) to reduce a loss. Depending on whether the machine-learned model is supervised, semi-supervised, unsupervised, etc. this loss may be determined based at least in part on a difference between an output generated by the model and ground truth data (e.g., a label, an indication of an outcome that resulted from a system using the output), a cost function, a fit of the parameter(s) to a set of data, a fit of an output to a set of data, and/or the like. In some examples, determining an output by a machine-learned model may comprise executing a set of inference operations executed by the machine-learned model according to the target machine-learned model's parameter(s) and structural hyperparameter(s) and using/operating on a set of input data.

Moreover, any discussion of receiving data associated with an individual that may be protected, confidential, or otherwise sensitive information, is understood to have been preceded by transmitting a notice of use of the data to a computing device, account, or other identifier (collectively, "identifier") associated with the individual, receiving an indication of authorization to use the data from the identifier, and/or providing a mechanism by which a user may cause use of the data to cease or a copy of the data to be provided to the user.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A system comprising:

one or more processors; and one or more memories storing processor-executable instructions that, when executed by the one or more processors, cause the one or more processors to perform operations comprising:

receiving a claim data set indicative of a claim count associated with an address of a provider over a particular time period;

determining, using a machine learning model trained using unsupervised learning techniques, that the address is associated with decreasing activity based at least in part on the claim data set, wherein the machine learning model comprises a plurality of parameters, and wherein the machine learning model is trained at least in part by:

(i) inputting, into the machine learning model, one or more claim counts associated with one or more addresses for a first time period, to obtain one or more outputs indicative of one or more predicted claim counts associated with the one or more addresses, respectively;

(ii) updating the plurality of parameters based on one or more differences between the one or more outputs and one or more claim counts of a second period subsequent to the first time period, respectively; and (iii) repeating operations (i) and (ii) until a predetermined condition is satisfied;

responsive to determining that the address is associated with decreasing activity, determining an inactive metric for the address based at least in part on the claim data set;

determining that the inactive metric fails to satisfy a first condition;

responsive to determining that the inactive metric fails to satisfy the first condition, determining an active metric for the address based at least in part on the claim data set;

determining that the active metric satisfies a second condition; and responsive to determining that the active metric satisfies the second condition, causing one or more data objects to indicate that the address is active.

2. The system of claim 1, wherein the claim data set is a first claim data set, and determining the active metric includes:

obtaining a second claim data set indicative of (i) a plurality of claim counts associated with a plurality of addresses, respectively, and (ii) one or more features of a plurality of providers;

generating one or more distribution graphs of the plurality of claim counts with respect to corresponding ones of the one or more features;

determining parameters of the one or more distribution graphs;

determining, using the parameters, one or more component metrics corresponding to respective ones of the one or more distribution graphs; and determining the active metric using the one or more component metrics and one or more weights corresponding to respective ones of the one or more component metrics.

3. The system of claim 2, wherein:

the parameters of a distribution graph of the one or more distribution graphs include a mean value $\mu$ and a standard deviation $\delta$;

a component metric of the one or more component metrics is a z score, determined by $z=(x-\mu)/\sigma$; and x is the claim count associated with the address of the provider.

4. The system of claim 2, wherein determining the parameters of the one or more distribution graphs includes:

regressing the one or more distribution graphs to obtain one or more standard distribution graphs, respectively; and determining the parameters based on the one or more standard distribution graphs.

5. The system of claim 4, wherein at least one of the one or more standard distribution graphs is a Gaussian distribution.

6. The system of claim 2, wherein the active metric is a weighted sum of the one or more component metrics and the one or more weights.

7. The system of claim 2, wherein the processor-executable instructions, when executed by the one or more processors, cause the one or more processors to perform operations comprising:

determining the one or more weights using reinforcement learning from human feedback (RLHF) techniques.

8. The system of claim 1, wherein the claim data set is a first claim data set indicative of a first claim count associated with a first address of a first provider over the particular time period, the particular time period is a first particular time period, the inactive metric is a first inactive metric, the active metric is a first active metric, the one or more data objects are one or more first data objects, and the processor-executable instructions, when executed by the one or more processors, cause the one or more processors to perform operations comprising:

receiving a second claim data set indicative of a second claim count associated with a second address of a second provider over a second particular time period;

determining that the second address is associated with increasing activity based at least in part on the second claim data set;

responsive to determining that the second address is associated with increasing activity, determining a second active metric for the second address using unsupervised learning techniques and based at least in part on the second claim data set;

determining that the second active metric satisfies a third condition; and responsive to determining that the second active metric satisfies the third condition, causing one or more second data objects to indicate that the second address is active.

9. The system of claim 1, wherein the claim data set is a first claim data set indicative of a first claim count associated with a first address of a first provider over the particular time period, the particular time period is a first particular time period, the inactive metric is a first inactive metric, the active metric is a first active metric, the one or more data objects are one or more first data objects, and the processor-executable instructions, when executed by the one or more processors, cause the one or more processors to perform operations comprising:

receiving a second claim data set indicative of a second claim count associated with a second address of a second provider over a second particular time period;

determining that the second address is associated with decreasing activity based at least in part on the second claim data set;

responsive to determining that the second address is associated with decreasing activity, determining a second inactive metric for the second address using unsupervised learning techniques and based at least in part on the second claim data set;

determining that the second inactive metric satisfies a third condition; and responsive to determining that the second inactive metric satisfies the third condition, causing one or more second data objects to indicate that the second address is inactive.

10. The system of claim 9, wherein the processor-executable instructions, when executed by the one or more processors, cause the one or more processors to perform operations comprising:

responsive to determining the second address to be inactive, initiating a communication with the provider; and responsive to receiving feedback on the communication indicative of the second address being active, modifying parameters for determining the second inactive metric, and modifying the one or more second data objects to indicate that the second address is active.

11. A method comprising:

receiving, by one or more processors, a claim data set indicative of a claim count associated with an address of a provider over a particular time period;

determining, by the one or more processors and using a machine learning model trained using unsupervised learning techniques, that the address is associated with decreasing activity based at least in part on the claim data set, wherein the machine learning model comprises a plurality of parameters, and wherein the machine learning model is trained at least in part by:

(i) inputting, into the machine learning model, one or more claim counts associated with one or more addresses for a first time period, to obtain one or more outputs indicative of one or more predicted claim counts associated with the one or more addresses, respectively;

(ii) updating the plurality of parameters based on one or more differences between the one or more outputs and one or more claim counts of a second period subsequent to the first time period, respectively; and (iii) repeating operations (i) and (ii) until a predetermined condition is satisfied;

responsive to determining that the address is associated with decreasing activity, determining, by the one or more processors, an inactive metric for the address based at least in part on the claim data set;

determining, by the one or more processors, that the inactive metric fails to satisfy a first condition;

responsive to determining that the inactive metric fails to satisfy the first condition, determining, by the one or more processors, an active metric for the address based at least in part on the claim data set;

determining, by the one or more processors, that the active metric satisfies a second condition; and responsive to determining that the active metric satisfies the second condition, causing, by the one or more processors, one or more data objects to indicate that the address is active.

12. The method of claim 11, wherein the claim data set is a first claim data set, and determining the active metric includes:

obtaining, by the one or more processors, a second claim data set indicative of (i) a plurality of claim counts associated with a plurality of addresses, respectively, and (ii) one or more features of a plurality of providers;

generating, by the one or more processors, one or more distribution graphs of the plurality of claim counts with respect to corresponding ones of the one or more features;

determining, by the one or more processors, parameters of the one or more distribution graphs;

determining, by the one or more processors and using the parameters, one or more component metrics corresponding to respective ones of the one or more distribution graphs; and determining, by the one or more processors, the active metric using the one or more component metrics and one or more weights corresponding to respective ones of the one or more component metrics.

13. The method of claim 12, wherein:

the parameters of a distribution graph of the one or more distribution graphs include a mean value $\mu$ and a standard deviation $\delta$;

a component metric of the one or more component metrics is a z score, determined by $z=(x-\mu)/\sigma$; and x is the claim count associated with the address of the provider.

14. The method of claim 12, wherein determining the parameters of the one or more distribution graphs includes:

regressing, by the one or more processors, the one or more distribution graphs to obtain one or more standard distribution graphs, respectively; and determining, by the one or more processors, the parameters based on the one or more standard distribution graphs.

15. The method of claim 14, wherein at least one of the one or more standard distribution graphs is a Gaussian distribution.

16. The method of claim 12, wherein the active metric is a weighted sum of the one or more component metrics and the one or more weights.

17. The method of claim 12, further comprising:

determining, by the one or more processors, the one or more weights using reinforcement learning from human feedback (RLHF) techniques.

18. The method of claim 11, wherein the claim data set indicative of the claim count associated with the address of the provider over the particular time period is a first claim data set indicative of a first claim count associated with a first address of a first provider over the particular time period, the particular time period is a first particular time period, the inactive metric is a first inactive metric, the active metric is a first active metric, the one or more data objects are one or more first data objects, the method further comprising:

receiving, by the one or more processors, a second claim data set indicative of a second claim count associated with a second address of a second provider over a second particular time period;

determining, by the one or more processors, that the second address is associated with increasing activity based at least in part on the second claim data set;

responsive to determining that the second address is associated with increasing activity, determining, by the one or more processors, a second active metric for the second address using unsupervised learning techniques and based at least in part on the second claim data set;

determining, by the one or more processors, that the second active metric satisfies a third condition; and responsive to determining that the second active metric satisfies the third condition, causing, by the one or more processors, one or more second data objects to indicate that the second address is active.

19. The method of claim 11, wherein the claim data set indicative of the claim count associated with the address of the provider over the particular time period is a first claim data set indicative of a first claim count associated with a first address of a first provider over the particular time period, the particular time period is a first particular time period, the inactive metric is a first inactive metric, the active metric is a first active metric, the one or more data objects are one or more first data objects, the method further comprising:

receiving, by the one or more processors, a second claim data set indicative of a second claim count associated with a second address of a second provider over a second particular time period;

determining, by the one or more processors, that the second address is associated with decreasing activity based at least in part on the second claim data set;

responsive to determining that the second address is associated with decreasing activity, determining, by the one or more processors, a second inactive metric for the second address using unsupervised learning techniques and based at least in part on the second claim data set;

determining, by the one or more processors, that the second inactive metric satisfies a third condition; and responsive to determining that the second inactive metric satisfies the third condition, causing, by the one or more processors, one or more second data objects to indicate that the second address is inactive.

20. The method of claim 19, further comprising:

responsive to determining the second address to be inactive, initiating, by the one or more processors, a communication with the provider; and responsive to receiving feedback on the communication indicative of the second address being active, modifying, by the one or more processors, parameters for determining the second inactive metric, and modifying, by the one or more processors, the one or more second data objects to indicate that the second address is active.

* * * * *